(12) United States Patent
Azizi et al.

(10) Patent No.: US 9,668,281 B2
(45) Date of Patent: May 30, 2017

(54) DETECTION OF 802.11P SIGNALS IN 802.11 N/AC ENABLED DEVICES

(71) Applicant: Intel Corporation, Santa Clara, CA (US)

(72) Inventors: Shahrnaz Azizi, Cupertino, CA (US); Thomas J. Kenney, Portland, OR (US); Eldad Perahia, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 56 days.

(21) Appl. No.: 14/779,053

(22) PCT Filed: Nov. 26, 2013

(86) PCT No.: PCT/US2013/071907
§ 371 (c)(1),
(2) Date: Sep. 22, 2015

(87) PCT Pub. No.: WO2014/182335
PCT Pub. Date: Nov. 13, 2014

(65) Prior Publication Data
US 2016/0050692 A1 Feb. 18, 2016

Related U.S. Application Data

(60) Provisional application No. 61/821,409, filed on May 9, 2013.

(51) Int. Cl.
*H04W 74/08* (2009.01)
*H04W 84/12* (2009.01)

(52) U.S. Cl.
CPC ........ *H04W 74/0816* (2013.01); *H04W 84/12* (2013.01)

(58) Field of Classification Search
CPC ............. H04W 84/12; H04W 72/0446; H04W 72/0453; H04W 72/042; H04L 5/0055
See application file for complete search history.

(56) References Cited

U.S. PATENT DOCUMENTS 8,175,539 B2 * 5/2012 Diener ................. H04L 1/0001
370/318
2005/0123060 A1 6/2005 Maltsev et al.
(Continued)

FOREIGN PATENT DOCUMENTS

EP 2461530 A1 6/2012
WO WO-2014182335 A1 11/2014

OTHER PUBLICATIONS

"International Application Serial No. PCT/US2013/071907, International Search Report mailed Feb. 21, 2014", 4 pgs.
(Continued)

*Primary Examiner* — Jamal Javaid
(74) *Attorney, Agent, or Firm* — Schwegman Lundberg & Woessner, P.A.

(57) ABSTRACT

Embodiments allow a wireless device configured to work with the 802.11n/ac standard to work in the communication bands where 802.11p devices operate with little change. Embodiments may receive signals using a receiver adapted for the wider bandwidth 802.11n/ac signals. Embodiments may also increase the sensitivity of the receiver to reduce the likelihood of missing the presence of a lower bandwidth 802.11p signal. When a signal is detected, embodiments may process the incoming signal as if it were an 802.11n/ac signal while also processing incoming signal samples in a way that effectively narrows the receiver bandwidth to identify whether an 802.11p signal is present. If the device detects the presence of an 802.11n/ac signal, it may terminate the 802.11p signal processing and proceed with normal 802.11n/ac operation. If the device detects the presence of an
(Continued)

802.11p signal, it may terminate 802.11n/ac processing and trigger collision avoidance processes.

22 Claims, 7 Drawing Sheets

(56) References Cited

U.S. PATENT DOCUMENTS

| | | |
|---|---|---|
| 2011/0228750 A1 | 9/2011 | Tomici et al. |
| 2013/0074129 A1 | 3/2013 | Reisman |
| 2013/0095772 A1 | 4/2013 | Hassan et al. |

OTHER PUBLICATIONS

"International Application Serial No. PCT/US2013/071907, Written Opinion mailed Feb. 21, 2014", 6 pgs.
"European Application Serial No. 13883901.4, Extended European Search Report mailed Dec. 1, 2016", 6 pgs.

* cited by examiner

DETECTION OF 802.11P SIGNALS IN 802.11 N/AC ENABLED DEVICES

PRIORITY CLAIM

This application is a U.S. National Stage Application under 35 U.S.C. 371 from International Application No. PCT/US2013/071907, filed Nov. 26, 2013, claims the benefit of priority to U.S. Provisional Patent Application Ser. No. 61/821,409, filed May 9, 2013, both of which are incorporated herein by reference in their entirety.

TECHNICAL FIELD

Embodiments pertain to wireless communications. More particularly, some embodiments relate to the detection of signals having a narrower bandwidth by receivers that are enabled for the detection of signals having a wider bandwidth.

BACKGROUND

As wireless spectrum becomes more crowded, the Federal Communications Commission (FCC) sometimes proposes modification of existing rules governing certain wireless bands to allow coexistence among multiple uses as long as certain principles are followed. For example, the FCC has proposed modification of the existing rules governing Unlicensed-National Information Infrastructure (U-NII) use of the 5 GHz band of which 195 MHz of additional spectrum is allocated for U-NII shared access. There are several current uses of the expansion bands, including use by the Intelligent Transportation Systems, which adhere to the IEEE 802.11p standard. If existing 802.11n/ac devices (meaning devices enabled for 802.11n and/or 802.11ac) desire to take advantage of the expansion spectrum, they should be capable of coexisting with 802.11p enabled devices.

DETAILED DESCRIPTION

Figure 1:
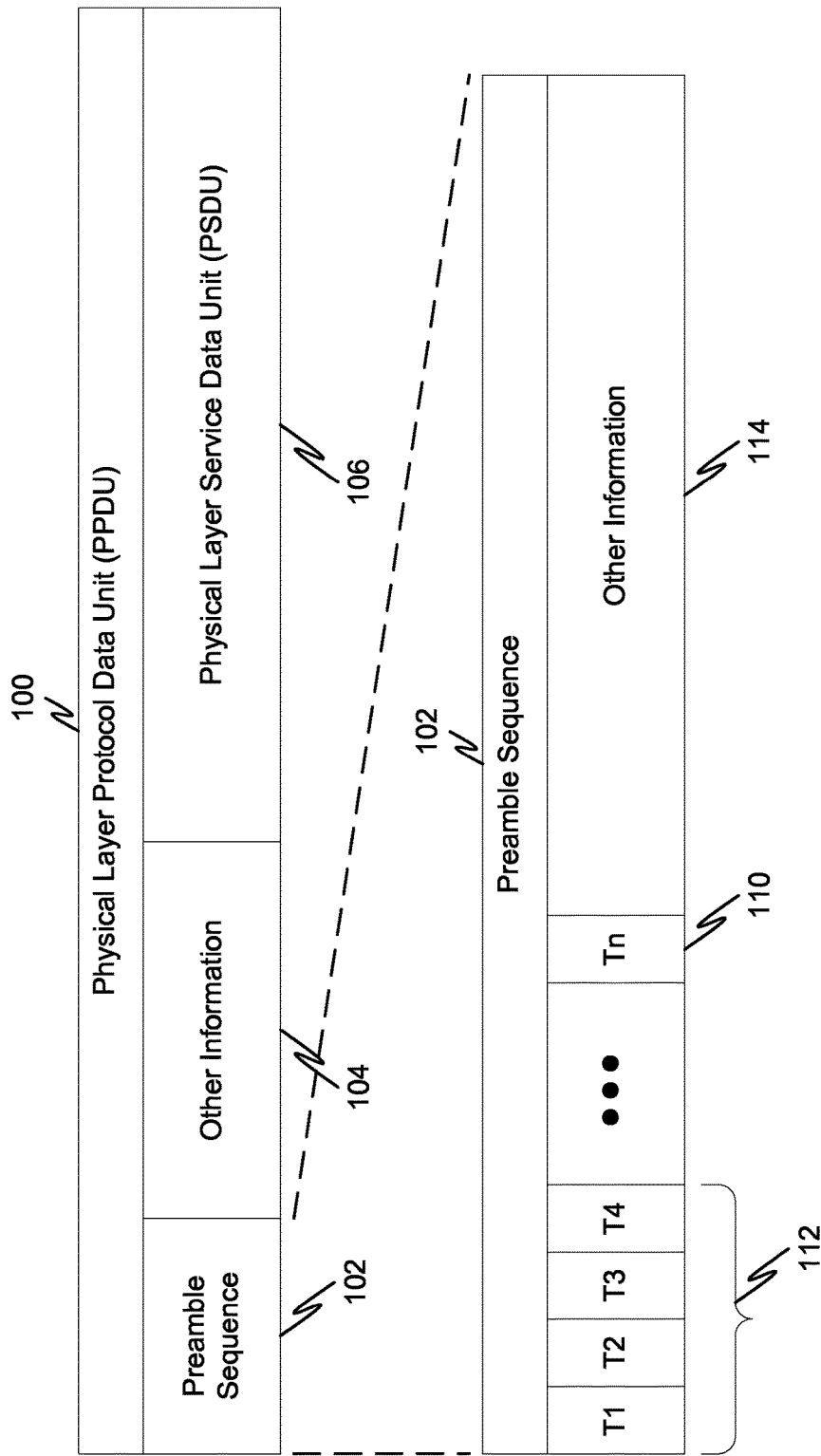
FIG. 1 illustrates an example physical layer protocol data unit.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Various modifications to the embodiments will be readily apparent to those skilled in the art, and the generic principles defined herein may be applied to other embodiments and applications without departing from the scope of the disclosure. Moreover, in the following description, numerous details are set forth for the purpose of explanation. However, one of ordinary skill in the art will realize that embodiments of the disclosure may be practiced without the use of these specific details. In other instances, well-known structures and processes are not shown in block diagram form in order to not obscure the description of the embodiments with unnecessary detail. Thus, the present disclosure is not intended to be limited to the embodiments shown, but is to be accorded the widest scope consistent with the principles and features disclosed herein.

The IEEE 802.11p standard allows 5 MHz, 10 MHz, and 20 MHz channel bandwidths. The 20 MHz channel bandwidth is the same as the IEEE 802.11a and, assuming alignment of the channel center frequency, the physical signal coexistence is already addressed in the IEEE 802.11n standard. However, in the case of the 5 MHz and 10 MHz bandwidths, the signals have similar Orthogonal Frequency Division Multiplexing (OFDM) structure, but with smaller subcarrier spacing. Thus, new coexistence rules are needed. It may be assumed that the devices already operating on recently released spectrum (e.g., the 195 MHz of additional spectrum allocated for U-NII shared access) will not change their operation. Therefore, future 802.11n/ac devices will need to detect 802.11p signals as a first step for coexistence. Upon detection of an 802.11p signal, 802.11n/ac devices may take steps to avoid interference with any 802.11p devices or may use other mechanisms for coexistence.

802.11n/ac devices use 20 MHz, 40 MHz, 80 MHz, and 160 MHz channel bandwidths. Embodiments described below enable 802.11n/ac devices to treat the 5 MHz and/or 10 MHz 802.11p signals (referred to as 5/10 MHz signals or 5/10 MHz 802.11p signals) in its operating channel as if there is a 20 MHz reception. Embodiments may receive an 802.11p 5/10 MHz signal using a larger bandwidth RF front end of 20 MHz, and may process it with higher sampling rates typically associated with the wider front end. However, RF filtering at the wider front end expands the noise relative to the signal and, thus, decreases the Signal to Noise (SNR) performance by 3 dB for the 10 MHz signal and by 6 dB for the 5 MHz signal. Therefore, there may be cases where an 802.11n/ac device operating in the bands of the 802.11p 5/10 MHz signals will have a 3-6 dB higher Clear Channel Assessment (CCA) level for the 5/10 MHz 802.11p signal compared to a 20 MHz 802.11n/ac signal. This could cause the 802.11n/ac device to miss the presence of the 802.11p signal and begin transmission, resulting in a collision. As explained below, some embodiments may allow an increased false alarm rate in order to make it more likely that 802.11p 5/10 MHz signals are detected. The impact of a higher false alarm rate may be mitigated with further processing of received signals. Many of the embodiments may be implemented without significant hardware changes to current 802.11n/ac devices allowing them to operate within the 802.11p bands. To the extent that changes may be implemented through firmware and/or processing changes, existing devices may take advantage of the newer bands by updating software and/or firmware within the device. This not only extends the capability and useful life of existing devices, but also allows increased functionality and utility.

FIG. 1 illustrates an example physical layer protocol data unit (PPDU) 100. The PPDU 100 is not specific to any particular IEEE 802.11 standard, but is a general representation that is sufficient for the purposes of this disclosure. The PPDU 100 comprises a preamble sequence 102, other information 104, and a Physical Layer Service Data Unit (PSDU) 106. The preamble sequence 102 is used, among other things, to aid in the detection of an incoming signal. Other information 104 may contain different things, depending on the exact type of PPDU and standard. In one example, other information 104 may contain a SIGNAL field designed to help the receiver decode the PSDU 106. The PSDU 106 contains the frame being sent (e.g., the payload).

The preamble sequence 102 is illustrated in expanded form as shown in FIG. 1. The preamble sequence 102 has a plurality of training sequences, sometimes referred to as Short Training Sequences (STS). The STS of FIG. 1 are illustrated as STS 112, with the final STS (Tn) illustrated as 110. The preamble sequence 102 may also contain other information, represented by other information 114. The length of each STS 112 is dependent on the 802.11 variant being considered. In the case of 802.11n/ac, each STS is 0.8 µs long. In the case of 802.11p, the length of the STS 112 may be different for different bandwidth signals. In the case of a 10 MHz bandwidth signal, the length of the STS 112 would be 1.6 µs long and for a 5 MHz bandwidth signal, the length of the STS 112 would be 3.2 µs long.

Figure 2:
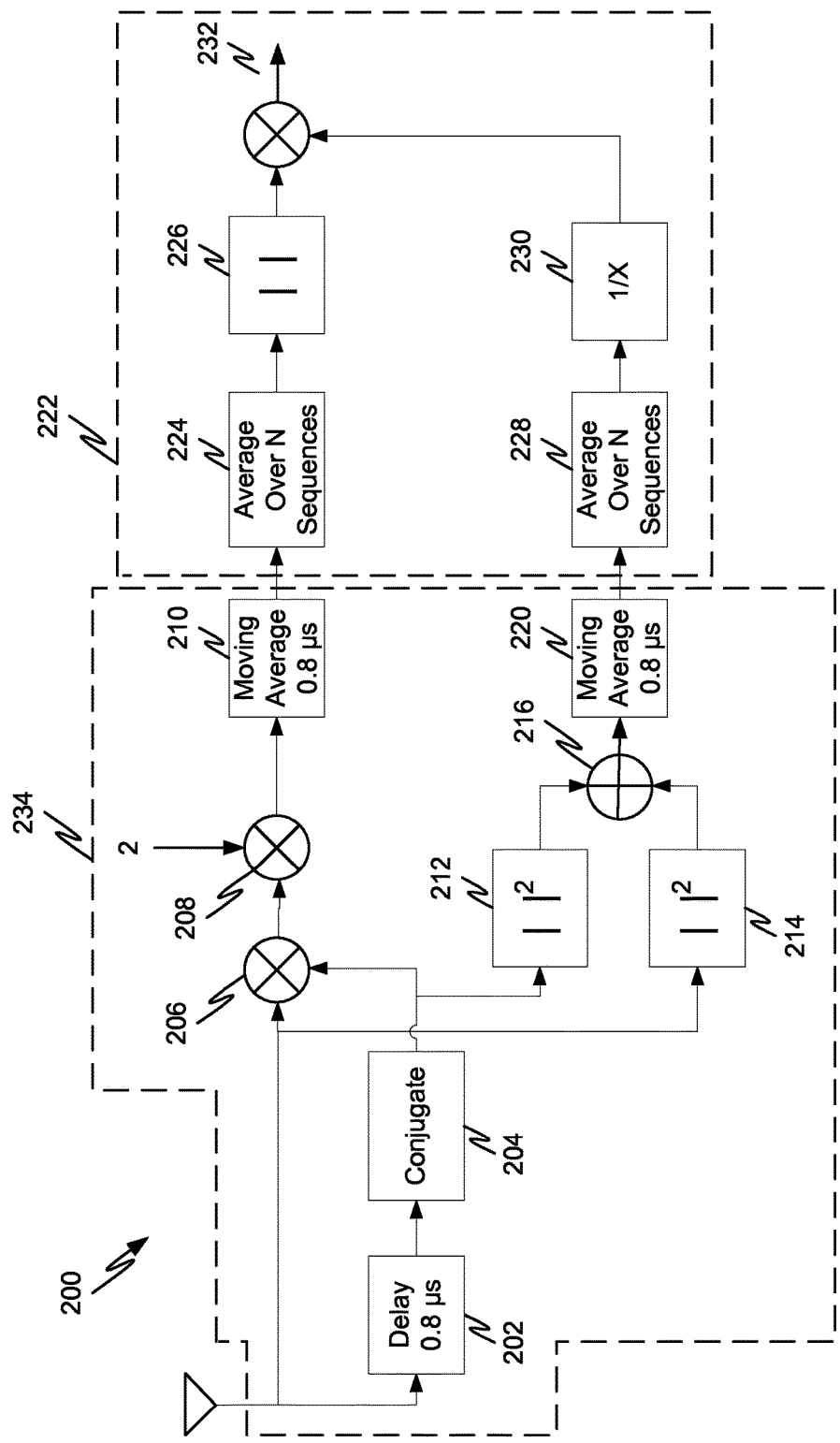
FIG. 2 illustrates an example receiver.

FIG. 2 illustrates an example receiver 200 that may receive, for example, 802.11n/ac signals. Detection of a signal is accomplished by making use of the periodicity of the STS 112 in the PPDU 100. The example receiver 200 of FIG. 2 uses a delay and correlate mechanism to detect the presence of the repeating STS 112 in the PPDU 100. For purposes of this discussion, the receiver 200 may be broken into two portions 234 and 222.

In the first portion of the receiver 234, a received signal is delayed by the STS length (0.8 µs) in operation 202. The signal is then conjugated in operation 204 and correlated with itself by mixing operation 206. A scaling factor may be applied in mixing operation 208 and a moving average over the STS length (0.8 µs) is taken in operation 210.

In the other branch of the first portion of the receiver 234, the square magnitude of the delayed and conjugated signal (output of operation 204) is taken in operation 212. The square magnitude of the received signal is taken in operation 214. These factors are added together (operation 216) and the moving average over the STS length (0.8 µs) is taken in operation 220.

In the second portion of the receiver 222, the two signals (output of operation 210 and 220) are averaged over N sequences in operation 224 and 228, respectively. For a typical 20 MHz 802.11n/ac signal, N is equal to 4 (0.8 µs). The magnitude of the output of averaging operation 224 is divided by the output of averaging operation 228 as illustrated by operations 226 and 230 to produce output signal 232. Output signal 232 may then be input into a detector to detect the presence of an incoming signal. In many embodiments, a threshold detector may be used such that if an output signal 232 exceeds a given threshold, detection is declared and the device performs additional operations associated with an incoming signal.

The operations illustrated in the receiver 200 may be performed in hardware, with a processor programmed by firmware/software, or some combination thereof. A typical receiver will have an RF front end where processing is performed by hardware. At some point, the incoming signal is usually sampled and processing proceeds digitally from that point.

For receivers, such as the receiver in FIG. 2, there are generally several parameters that can be adjusted to trade off probability of missed detection (and probability of detection) and probability of false alarm. Typically, as parameters are adjusted to lower the probability of false alarm (for a given SNR), the probability of missed detection increases. However, depending on the particular receiver design, the particular hardware used, the particular parameter adjusted, and the particular goals, it may be desirable to allow false alarm rates to rise to get a particular detection characteristic or lower false alarm rates and allow the probability of missed detection to rise somewhat.

Figure 3:
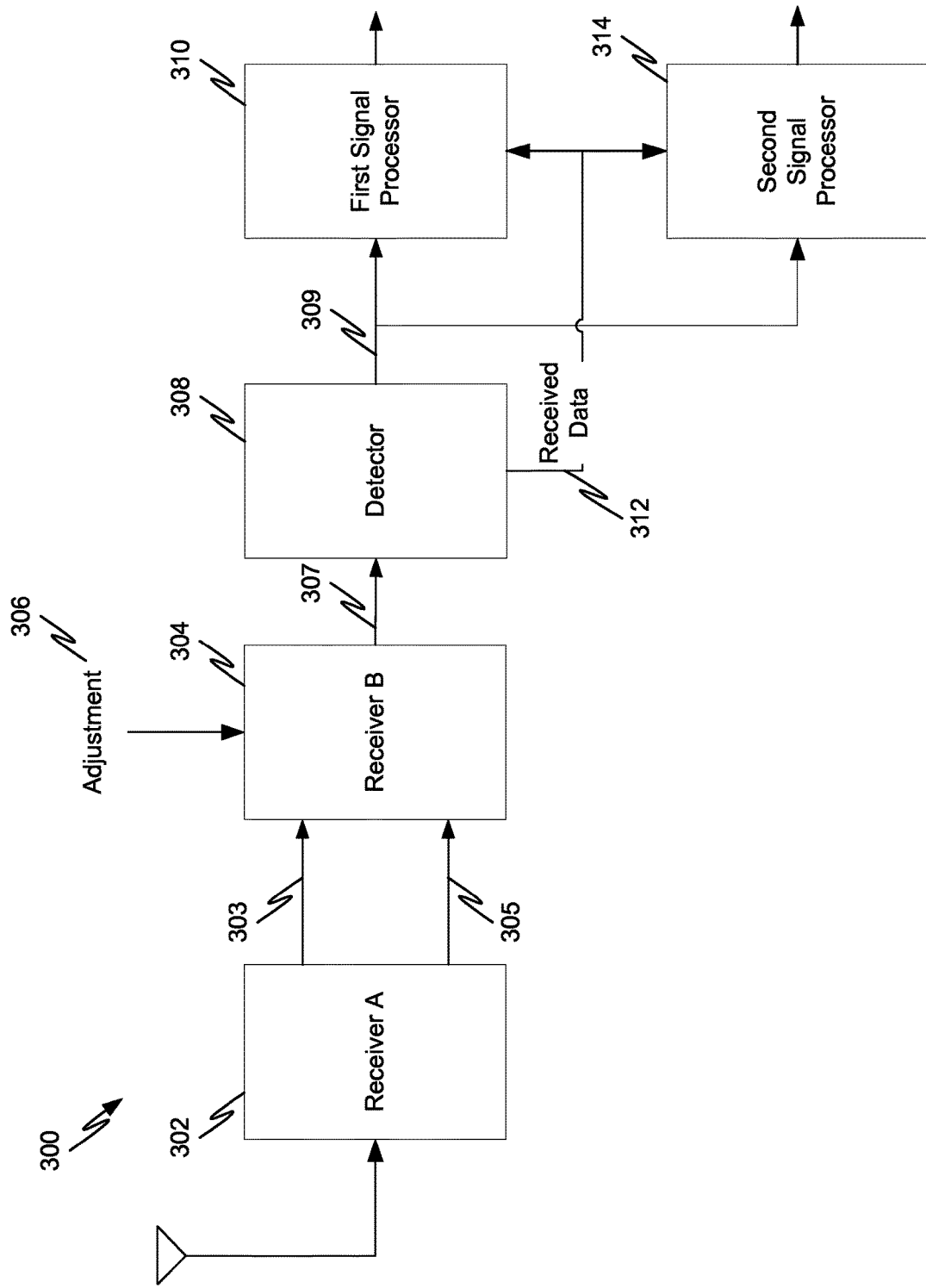
FIG. 3 illustrates an example receiver to detect both 802.11p type signals and 802.11n/ac signals.

FIG. 3 illustrates an example receiver 300 to detect both 802.11p type signals and 802.11n/ac signals. Such a receiver 300 may have, for example, a wider band front end to receive the wider band 802.11n/ac signals. The receiver 300 is illustrated as having a first portion, receiver portion A 302, and a second portion, receiver portion B 304. In this embodiment, the receiver portion A 302 represents portions of the receiver 300 where adjustments will not be made to tradeoff false alarm rates and probability of missed detection, and receiver portion B 304 represents portions of the receiver where adjustments will be made to tradeoff false alarm rates and probability of missed detection. Adjustment 306 represents these adjustments.

If receiver 300 is implemented using a delay and correlate mechanism such as that illustrated in detail in FIG. 2, receiver portion A may include such functions as delaying a received signal an STS length such as that illustrated by operation 202 of FIG. 2. The signal may then conjugated by an operation like operation 204 of FIG. 2 and correlated with itself by a mixing operation like mixing operation 206 of FIG. 2. A scaling factor may be applied in a mixing operation like mixing operation 208 of FIG. 2. The output of all these operations may be a first branch of the receiver, labeled 303 in FIG. 3.

In a second branch of the receiver portion A 302, the square magnitude of the delayed and conjugated signal (output of the operation such as operation 204 of FIG. 2) may be performed in an operation like operation 212 of FIG. 2. The square magnitude of the received signal may also be performed in an operation like operation 214 of FIG. 2. These factors may be added together (such as in operation 216 of FIG. 2) in order to produce the second output 305 of the receiver portion A 302.

Receiver portion B 304 may include those portions of the receiver where adjustments may be made to trade off false alarm and probability of detection. For a receiver structure such as that illustrated in FIG. 2, that may include the moving average of both branches of the output of receiver portion A 302 (e.g., outputs 303 and 305). These moving average may be operations such as those described in conjunction with moving average 210 and moving average 220 of FIG. 2. Additionally, as described above in conjunction with FIG. 2, averaging over N STS sequences as well as the operations to generate the output (e.g., 232 of FIG. 2) into a detector may also be included in receiver portion B 304. Thus, operations like operation 224, 226, 228, 230 and the mixer to generate output 232 of FIG. 2 may all be included in receiver portion B 304. Thus, the output 307 of receiver portion B 304 may be generated in like manner to output 232 of FIG. 2.

Detector 308 is typically a threshold detector that employs a threshold to determine whether or not a signal is present. In FIG. 3, detector output 309 represents the "signal present" determination that may then kick off operation of first signal processor 310 and second signal processor 314.

With a wider band front end, as explained above, incoming 802.11p signals may have a 3-6 dB disadvantage over a similar 802.11n/ac signal due to the narrower band signal of the 802.11p and the wider front end. The receiver 300 may ensure that the probability of missed detection of an 802.11p signal is acceptable by adjustment 306 which may allow the false alarm rate to rise in order to get acceptable probability of missed detection for an incoming 802.11p signal.

While not specifically illustrated in FIG. 3, it may also be possible to trade off probability of false alarm with probability of missed detection by adjusting parameters within the detector 308. Thus, if the detector 308 employs a threshold, adjusting the threshold will also adjust the probability of false alarm and probability of missed detection of the receiver 300. Such changes may be made as an alternative to, or in addition to the adjustment 306. In some embodiments of the receiver 300, the detector 308 may employ a threshold as part of the detection process.

The receiver 300 may also comprise a first signal processor 310 and a second signal processor 314, which may each be targeted toward processing a different signal (e.g., 802.11n/ac or 802.11p). For example, if the receiver 300 is an 802.11n/ac receiver, then first signal processor 310 may include the typical processing the device performs after detection of a possible incoming 802.11n/ac communication. In addition, the first signal processor 310 may comprise functionality to terminate the processing of the second signal processor 314 in the event that the first signal processor 310 positively identifies an incoming 802.11n/ac communication. As an alternative, such functionality may be implemented in a different location so that the first signal processor 310 may notify that location in order to initiate termination of the processing of the second signal processor 314. Example details on how such a processor may be implemented are discussed in greater detail below.

The second signal processor 314 may represent processing performed when an 802.11p signal has been detected by the detector 308. Since 802.11p signals are wider in bandwidth than the 5/10 MHz signals of 802.11p, such processing may include, for example, processing incoming signal samples to place a filter (or multiple filters) of an appropriate bandwidth across the receiver bandwidth. By way of example, and not limitation, assuming a 20 MHz receiver bandwidth, signal samples may be processed to place a 5 MHz bandwidth filter (or multiple such filters) across the 20 MHz bandwidth to determine whether a signal is actually present in an appropriate 5 MHz band. Similar examples exist for 10 MHz bandwidth 802.11p signals.

As another example, additional samples may be processed to see whether detection of an STS 112 (or multiple STS) occurs. Because of the different bandwidths, the STS 112 of a 802.11p 5 MHz signal is four times longer than the STS 112 of the 802.11n/ac 20 MHz signal. Thus, four times the length of processing needs to be considered before the detection of the STS 112 of the narrower band 5 MHz signal may be declared. These approaches may be combined, and other approaches may be taken as well.

Although the first signal processor 310 and the second signal processor 314 have been described in conjunction with 802.11ac and 802.11p signals processed by each, the concept may be applied to different signals with similar signal structure where one signal has a larger bandwidth than the other.

Figure 4:
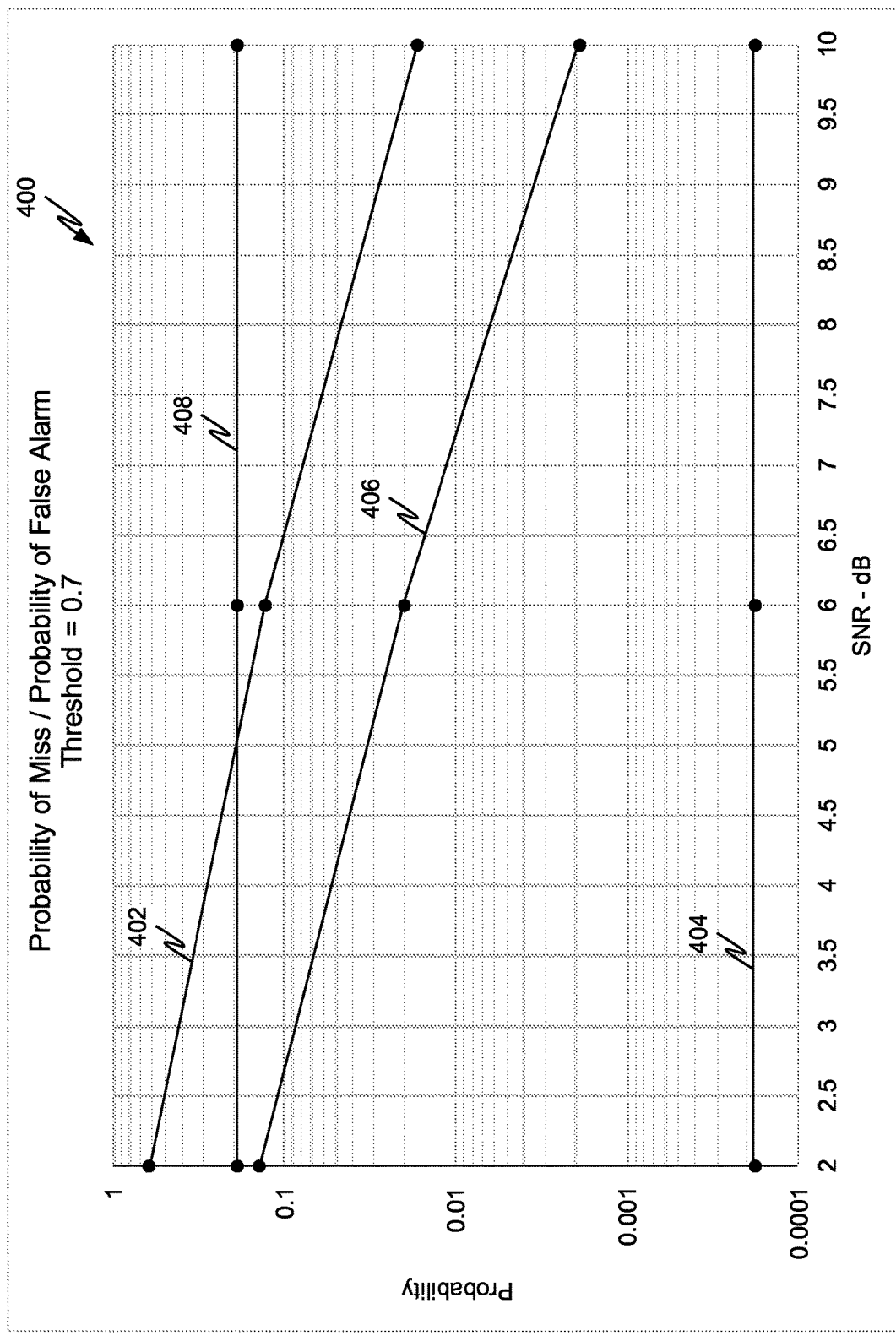
FIG. 4 illustrates an example tradeoff between probability of missed detection and probability of false alarm.

FIG. 4 illustrates an example tradeoff between probability of missed detection and probability of false alarm in, for example, a receiver suitable for use herein. The example in FIG. 4 is not intended to predict specific performance of any particular receiver embodiment, but to illustrate the types of tradeoffs that are possible with the receivers disclosed herein.

The basic structure of the receiver is like that illustrated in FIGS. 2, 3 and/or 5 where an average over N STS sequences may be used to tradeoff false alarm rates and probability of missed detection (or probability of detection) for signals at a given SNR. In FIG. 4, curve 402 represents the probability of missed detection when an average of N=4 STS sequences are taken. As expected, the probability of missed detection falls off as the SNR increases. Also, the probability of false alarm is low at about $2 \times 10^{-4}$ as shown by curve 404. If the number of STS averaged changes from N=4 to N=2, the probability of missed detection for a given SNR falls as shown by curve 406. However, the price of the change is that the probability of false alarm increases as shown by curve 408. Should the curves for N=1 be plotted, we would expect another increase in the probability of false alarm, but continuing decreases in the probability of missed detection. In this case, to keep the probability of false alarm to an acceptable level, the threshold may be adjusted. Adjustment of threshold levels was discussed above.

Figure 5:
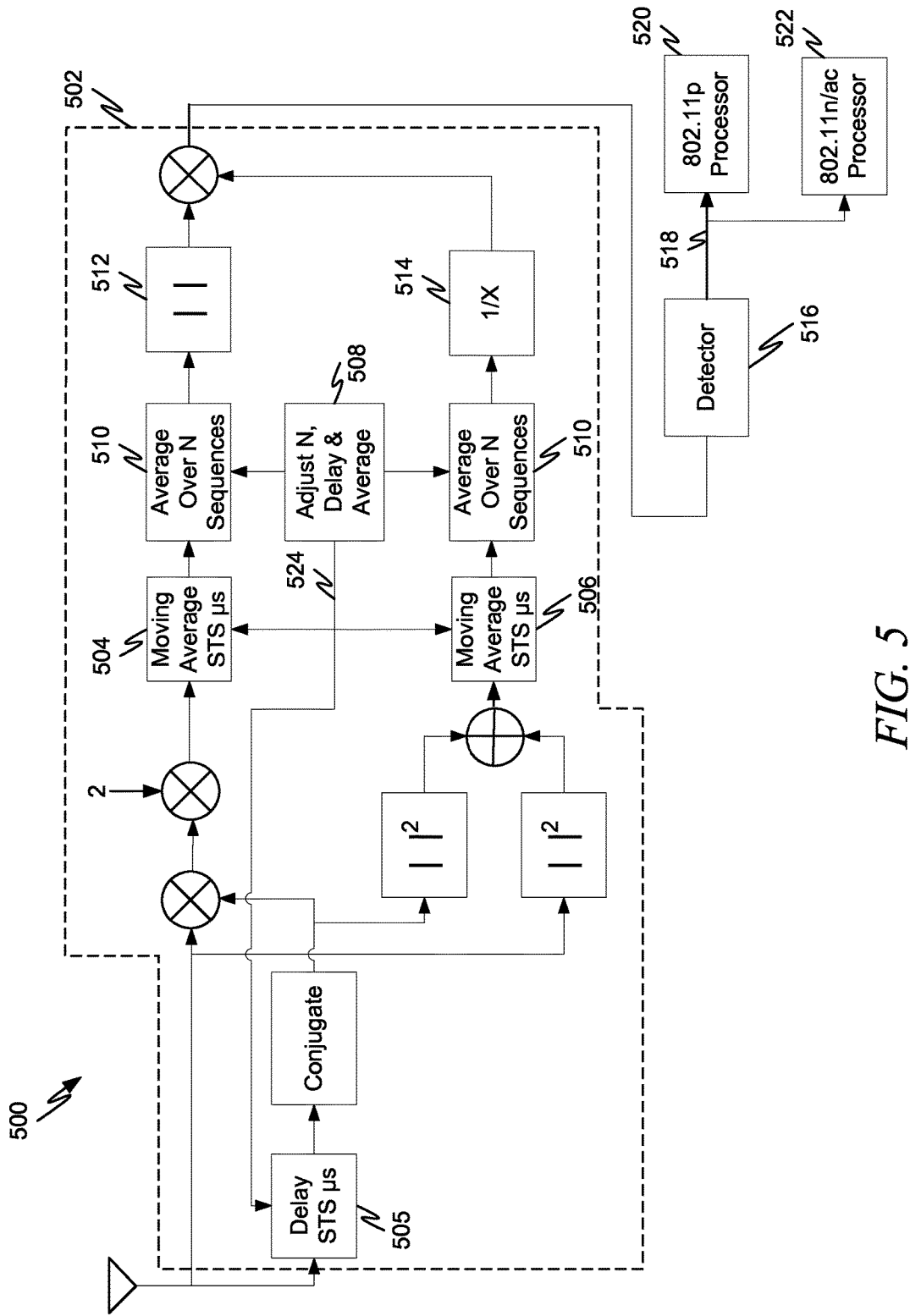
FIG. 5 illustrates an example of a partial system to detect both 802.11p and 802.11n/ac signals.

FIG. 5 illustrates an example of a system 500 to detect both 802.11p and 802.11n/ac signals. The system 500 shows a receiver 502, a detector 516, an 802.11p processor 520 and an 802.11n/ac processor 522.

Compared to FIG. 2, operation 508 has been added to adjust the number of STS sequences, N, that operation 510 averages over. Operation 508 may also adjust the correlation delay in delay operation 506 and the length of time of any moving averages such as moving average 504 and moving average 506. As illustrated in FIG. 4, adjusting N allows tradeoffs between the probability of false alarm and the probability of missed detection (or probability of detection). In many embodiments, adjusting N may be accomplished via a firmware update. In the alternative, firmware may be modified so that N may be dynamically modified according to a particular process. In some embodiments, N may be set so N=2 or N=1.

In addition to adjusting N, it may also be desirable to adjust other portions of the receiver to account for the equivalent length of time when receiving signals of different bandwidths, such as a 5 MHz or 10 MHz bandwidth 802.11p signals (as opposed to the 802.11n/ac 20 MHz bandwidth signal. For example, it may be desirable to adjust the length of time of delay operation 505 as well as moving average 504 and moving average 506. In a typical correlation receiver, these are matched to the time length of an STS. As previously discussed, a 5 MHz bandwidth signal has an STS length of 3.2 µs and a 10 MHz bandwidth signal has an STS length of 1.6 µs. Thus, when setting N=1 for a 5 MHz bandwidth signal, the correlation delay of operation 505 and the moving averages 504 and 506 may be set 3.2 µs. When setting N=2 for a 10 MHz bandwidth signal, the correlation delay and moving averages may be set at 1.6 µs. These adjustments are indicated by arrow 524. In some embodiments, the delay and moving averages may be performed digitally so it may be possible to adjust the delay and moving average via firmware/software. Processing received signals digitally may also allow for multiple delays to be processed, such as processing a 10 MHz and a 20 MHz delay and moving average to detect both 802.11p and 802.11n/ac signals.

As in FIG. 2, the magnitude of the upper output of the average over N sequence of operation 510 is divided by the output of the lower average over N sequence of operation 510 as shown by operations 512 and 514. This signal may be passed to the detector 516. The detector 516 may employ a threshold to decide when a signal is present such that if some value exceeds a threshold, the detector 516 determines that the incoming signal is present.

FIG. 5 also includes the 802.11p processor 520 which may begin processing signals once the detector 516 determines a signal is incoming. The 802.11p processor 520 may perform various functions including, but not limited to, determining whether the incoming signal is an 802.11p signal. Once the presence or absence of an 802.11p signal is determined, the 802.11p processor 520 may perform other functions depending on various factors and embodiments. For example, if the 802.11p processor 520 detects the presence of an 802.11p signal, this information may be passed to other processors and/or processes. Thus, the presence of an 802.11p signal may trigger various actions such as suspending the processing of incoming signals by the 802.11n/ac processor 522 or other processes/processors, triggering collision avoidance behavior for the device, and so forth. Collision avoidance behavior may include such behavior as switching to a different channel, suspending transmission activity for some period of time, and so forth.

FIG. 5 also includes the 802.11n/ac processor 522 which may begin (or continue) processing signals once the detector 516 determines a signal is incoming. The 802.11n/ac processor 522 may perform various functions including, but not limited to, determining whether the incoming signal is an 802.11n/ac signal. One the presence or absence of an 802.11n/ac signal is determined, the 802.11n/ac processor 522 may perform other functions depending on various factors and embodiments. For example, if an 802.11n/ac signal is present, the 802.11n/ac processor 522 may terminate (or cause to be terminated) any processing performed by the 802.11p processor 520 since no further 802.11p actions may be appropriate once the presence of an 802.11n/ac signal has been detected.

The presence of an 802.11n/ac signal may be detected in the typical way: determining whether the incoming signal has a valid SIGNAL field. If so, normal 802.11n/ac processing may continue with packet decoding, followed by a Cyclical Redundancy Check (CRC), and other normal 802.11n/ac operations.

If the 802.11n/ac processor 522 determines that the incoming signal is not a valid 802.11n/ac signal, through, for example, being unable to decode a valid SIGNAL field, the system may assume that the incoming signal is one that should trigger collision avoidance (such as assuming the incoming signal is a 802.11p signal). Additionally, or alternatively, the system may wait until the results from the 802.11p processor 520 are available to determine what to do. In one embodiment, once the 802.11n/ac processor 522 determines that no valid 802.11n/ac signal is present, the system may delay transmission activity until the 802.11p processor 520 decides whether or not an 802.11p signal is present. If it is present, then the system may trigger collision avoidance behavior. If it is not present, then the system may determine that the incoming signal was a false alarm and resume normal 802.11n/ac operation, including transmission activities.

The devices of FIG. 5 may be implemented in hardware or a combination of hardware and firmware/software or some combination thereof where parts are implemented in hardware and other parts in hardware and firmware/software. For example, the 802.11n/ac processor 522 may be implemented in hardware or a combination of hardware and firmware/software, depending on some existing 802.11n/ac device implementation. The 802.11p processor 520 may be initially implemented by changing the firmware/software of the current implementation to process additional samples in a digital fashion using a processor such as a microprocessor, signal processor, and so forth. In this way, an existing 802.11n/ac device may be adapted to operate in an environment where 802.11p devices are present. Over time, other embodiments may be developed that implement the 802.11p processor 520 in some combination of hardware and/or hardware and firmware/software so that functions previously implemented in firmware/software are implemented using specialized hardware. Furthermore, for portions implemented on hardware (such as a processor) and firmware/software, the 802.11p processor 520 and the 802.11n/ac processor 522 may be implemented using at least some shared hardware.

Figure 6:
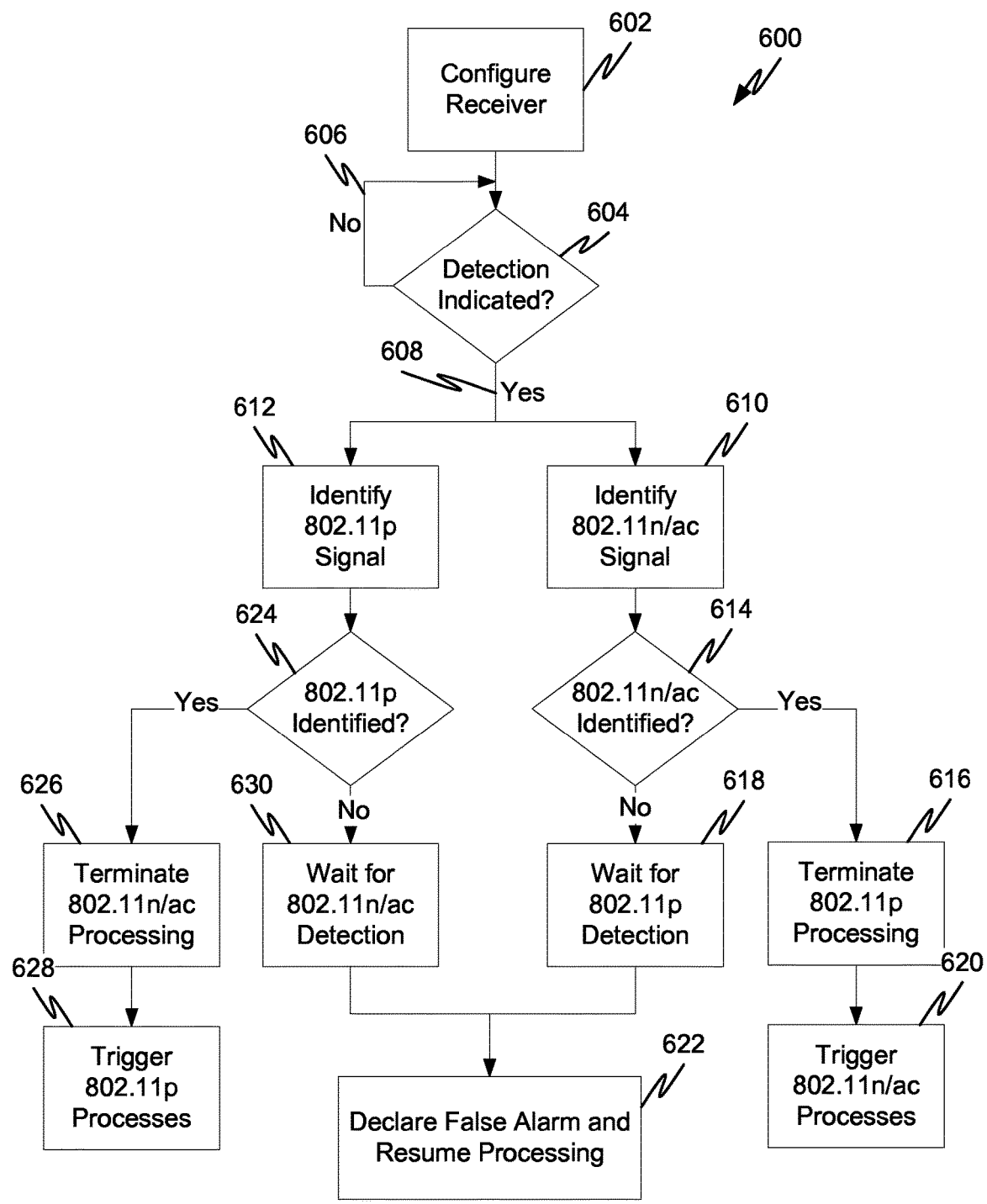
FIG. 6 illustrates an example flow diagram of a system to detect both 802.11p and 802.11n/ac signals.

FIG. 6 illustrates an example flow diagram 600 of a system to detect both 802.11p and 802.11n/ac signals. Such a system may comprise various implementations, such as the first signal processor 310 and/or the second signal processor 314 of FIG. 3 and/or the 802.11p processor 520 and/or 802.11n/ac processor 522 of FIG. 5. Thus, parts of the flow diagram may be implemented in these processors or may be implemented in a different processor such as the processor 704 of FIG. 7 discussed below.

In operation 602, the receiver is configured to have sufficient probability of false alarm and probability of missed detection (or probability of detection) characteristics, if needed. This may be accomplished, for example, by setting the number of STS averaged to a desired N such as N=2 or N=1. Additionally, or alternatively, one or more thresholds of a detector may be adjusted.

Once the receiver is properly configured, the system may do whatever it is designed to do until detection of an incoming signal is indicated. This process is represented by detection indicated operation 604 along with loopback path 606. Detection may be performed as indicated in conjunction with FIG. 3 and/or FIG. 5 as previously described. Detectors may be implemented in specialized hardware and/or a combination of hardware (such as a processor) and firmware/software.

When detection is indicated 604 as represented by the "yes" path 608, processing proceeds to sort out exactly what type of detection has been indicated. In the represented embodiment, processing proceeds along two paths that may be performed serially or in parallel. In operation 610, the system identifies whether an 802.11n/ac signal is present and in operation 612, the system identifies whether an 802.11p signal is present.

Turning to operation 610 first, the system may detect the presence of an 802.11n/ac signal in the normal way, such as by attempting to decode the SIGNAL field of the PPDU 100. If the SIGNAL field is valid, the system may determine that the incoming signal is an 802.11n/ac signal and proceed in accordance with the received 802.11n/ac signal. In this case, operation 614 would take the "yes" branch.

Once a valid 802.11n/ac signal has been identified, there is no further need to continue to process the signal to determine whether it is an 802.11p signal. Thus, any processing that relates to 802.11p signals, such as attempting to determine whether the incoming signal is an 802.11p signal, may be terminated. Operation 616 illustrates this function. Finally, normal system operations in connection with an 802.11n/ac signal may be triggered and/or continued as illustrated in operation 620, including transmission of messages as desired.

If a valid 802.11n/ac signal is not identified, the "no" branch of operation 614 is taken. In this situation, either the incoming signal is an 802.11p signal or a false alarm has occurred. To identify which one, the system may wait in operation 618 for the system to determine whether an 802.11p signal was identified.

Returning now to operation 612, the system may identify whether an 802.11p signal is incoming. This may be performed in a variety of ways. One way to detect an incoming 802.11p signal will be to place one or more filters of the appropriate bandwidth in the receiver band. In one such embodiment, assuming a 20 MHz receiver bandwidth, samples of the incoming signal may be processed to place a 5 MHz or 10 MHz bandwidth filter in the 20 MHz receiver band to detect whether there is a 5 MHz or 10 MHz signal concentration. Such processing may also place multiple filters across the receiver bandwidth. As another example, samples may be processed to see whether detection of an STS (or multiple STS) occurs. Because of the different bandwidths, the STS of a 5 MHz 802.11p signal is four times longer than the STS of the 20 MHz 802.11n/ac signal. Thus four times the length of processing is required needs to be considered before the detection of the STS of the narrower band 5 MHz signal may be declared. The STS 10 MHz 802.11p signal is twice as long as the STS of the 20 MHz 802.11n/ac signal so twice as many the length of processing may need to be considered over the 802.11n/ac signal to declare detection of an STS in the 10 MHz 802.11p signal. Various approaches may be combined, and other approaches may be taken as well.

Operation 624 determines whether an 802.11p signal has been identified. If so, then the "yes" branch is taken and any ongoing 802.11n/ac processing may be terminated as indicated in operation 626. Finally, the system may perform any operations associated with the detection of an 802.11p signal as illustrated in operation 628. Such operations may be, for example, to implement any collision avoidance strategies to keep from interfering with the 802.11p signals. These strategies may include, but are not limited to, precluding transmission where the transmissions will interfere with the 802.11p signal and/or switching channels.

If an 802.11p signal was not detected in operation 624, the "no" branch is taken and the system will wait (if necessary) until the system decides whether an 802.11n/ac signal was detected in operation 630.

When the system decides that neither an 802.11n/ac signal nor an 802.11p signal was detected, the system may declare a false alarm and resume processing as indicated in operation 622. Such a false alarm event may be one tradeoff made to ensure appropriate detection of a potentially interfering 802.11p signal. The false alarm may result in a transmission delay for the system. In other words, the system may have transmitted a message slightly sooner had a false alarm not occurred. However, the benefit obtained is that the system may appropriately coexist with 802.11p systems.

Although not covered in the flow diagram of FIG. 6, certain embodiments may want to account for what happens if the system decides that both an 802.11n/ac signal and an 802.11p signal are detected. Such an event may represent colliding incoming signals or may represent some sort of error condition. In such an instance, the system may take a variety of actions. One representative example system treats such an event as if an interfering 802.11p signal was received and performs the same actions as that case (e.g. reception of an interfering 802.11p signal). In another representative example, the system refrains from doing anything during the period of collision and treats the situation as ambiguous. Additionally, or alternatively, other actions may be performed.

Figure 7:
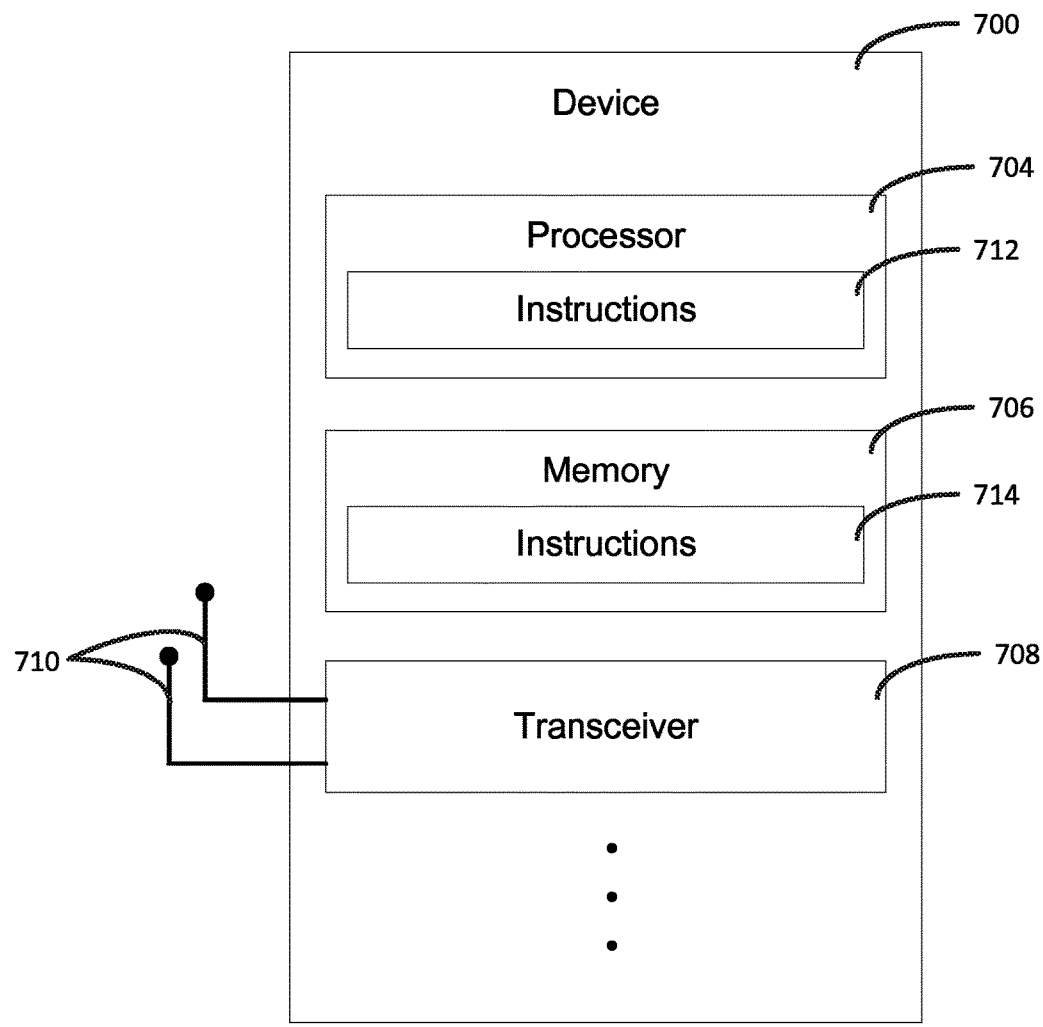
FIG. 7 illustrates a system block diagram of a wireless device, according to some embodiments.

FIG. 7 illustrates a system block diagram, according to some embodiments. FIG. 7 illustrates a block diagram of a device 700 that may represent any of the wireless devices discussed herein and may implement any of the flow diagrams or processing discussed herein. Such a device 700 could be, for example, a station designed to coexist in the presence of 802.11p devices. Thus, the device 700 may implement the receiver 302, 304 of FIG. 3, the receiver portion 502 of FIG. 5, and/or the flow diagram 600 of FIG. 6.

The device 700 may include a processor 704, a memory 706, a transceiver 708, antennas 710, instructions 712, 714, and possibly other components (not shown).

The processor 704 comprises one or more central processing units (CPUs), graphics processing units (GPUs), accelerated processing units (APUs), signal processors, or various combinations thereof. The processor 704 provides processing and control functionalities for the device 700 and may implement the flow diagrams and logic described above.

The memory 706 comprises one or more transient and/or static memory units configured to store instructions 712, 714 and data for the device 700. The transceiver 708 comprises one or more transceivers including, for an appropriate station or responder, a multiple-input and multiple-output (MIMO) antenna to support MIMO communications. For the device 700, the transceiver 708 receives transmissions and transmits transmissions. The transceiver 708 may be coupled to the antennas 710, which represent an antenna or multiple antennas, as appropriate to the device 700. The transceiver 708 may also implement all or portions of the receivers described above to receive (or to help receive) the 802.11n/ac and 802.11p signals described above.

The instructions 712, 714 comprise one or more sets of instructions or firmware/software executed on a computing device (or machine) to cause such a computing device (or machine) to perform any of the methodologies discussed herein. The instructions 712, 714 (also referred to as computer- or machine-executable instructions) may reside, completely or at least partially, within the processor 704 and/or the memory 706 during execution thereof by the device 700. While the instructions 712 and 714 are illustrated as separate, they can be part of the same whole. The processor 704 and the memory 706 also comprise machine-readable storage media. The instructions 712 and 714 may implement, for example, all or part of the flow diagram 600 of FIG. 6. Additionally, or alternatively, the instructions 712 and 714 may implement other processing and functionality discussed in conjunction with the other embodiments above such as FIG. 3 and/or FIG. 5.

In FIG. 7, processing and control functionalities are illustrated as being provided by the processor 704 along with the associated instructions 712 and 714. However, these are only examples of processing circuitry that comprise programmable logic or circuitry (e.g., as encompassed within a general-purpose processor or other programmable processor) that is temporarily configured by software or firmware to perform certain operations. In various embodiments, processing circuitry may comprise dedicated circuitry or logic that is permanently configured (e.g., within a special-purpose processor, application specific integrated circuit (ASIC), or array) to perform certain operations. It will be appreciated that a decision to implement a processing circuitry mechanically, in dedicated and permanently configured circuitry, or in temporarily configured circuitry (e.g., configured by software) may be driven by cost, time, energy-usage, package size, or other considerations.

Accordingly, the term "processing circuitry" should be understood to encompass a tangible entity, be that an entity that is physically constructed, permanently configured (e.g., hardwired), or temporarily configured (e.g., programmed) to operate in a certain manner or to perform certain operations described herein.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

The term "computer readable medium," "machine-readable medium" and the like should be taken to include a single medium or multiple media (e.g., a centralized or distributed database, and/or associated caches and servers) that store the one or more sets of instructions (e.g., 712, 714). The terms shall also be taken to include any medium that is capable of storing, encoding or carrying a set of instructions (e.g., 712, 714) for execution by the machine and that cause the machine to perform any one or more of the methodologies of the present disclosure. The term "computer readable medium," "machine-readable medium" shall accordingly be taken to include both "computer storage medium," "machine storage medium" and the like as well as "computer communication medium," "machine communication medium" and the like. The terms "computer storage medium," "machine storage medium" and the like shall be taken to include physically tangible sources including, solid-state memories, optical and magnetic media, or other tangible devices and carriers. These terms specifically exclude signals per se, carrier waves and other such physically intangible sources. The terms "computer communication medium," "machine communication medium" and the like shall be taken to include the physically intangible sources including, signals per se, carrier wave signals and the like that are specifically excluded by the terms "computer storage medium," "machine storage medium" and the like.

It will be appreciated that, for clarity purposes, the above description describes some embodiments with reference to different functional units or processors. However, it will be apparent that any suitable distribution of functionality between different functional units, processors or domains may be used without detracting from the embodiments of the disclosure. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present embodiments have been described in connection with some embodiments, it is not intended to be limited to the specific form set forth herein. One skilled in the art would recognize that various features of the described embodiments may be combined in accordance with the disclosure. Moreover, it will be appreciated that various modifications and alterations may be made by those skilled in the art without departing from the scope of the disclosure.

The following represent various example embodiments.

Example 1. A wireless device comprising:
at least one antenna;
transceiver circuitry coupled to the at least one antenna, the transceiver circuitry configured to receive an 802.11p communication and an 802.11n/ac communication;
memory;
a processor coupled to the memory and transceiver circuitry; and
instructions, stored in the memory, which when executed cause the processor to:
initiate a plurality of processes upon detection of an incoming signal, the plurality of processes comprising a first process associated with the 802.11n/ac communication and a second process associated with the 802.11p communication;
upon identification of the 802.11p communication:
terminate the first process; and
trigger 802.11p collision avoidance;
upon identification of the 802.11n/ac communication:
terminate the second process; and
continue 802.11n/ac processing.

Example 2. The wireless device of example 1 wherein the transceiver circuitry averages N Short Training Sequence intervals and uses a resultant average to detect an incoming signal.

Example 3. The wireless device of example 2 wherein N is either one or two.

Example 4. The wireless device of examples 1, 2 or 3 wherein the 802.11p collision avoidance comprises switching channels.

Example 5. The wireless device of examples 1, 2, 3 or 4 wherein the 802.11p collision avoidance comprises refraining from transmission for a period of time.

Example 6. A method comprising:
receiving an incoming signal occupying one of a plurality of bandwidths;
upon detection of the incoming signal, initiating a first processing of the incoming signal and a second processing of the incoming signal;
the first processing of the incoming signal comprising:
determine whether the incoming signal is an 802.11n/ac communication occupying a first bandwidth of the plurality of bandwidths;
upon determining that the incoming signal is an 802.11n/ac communication then:
terminating the second processing; and
initiating actions in accordance with the received 802.11n/ac communication;
the second processing of the incoming signal comprising:
determine whether the incoming signal is an 802.11p communication occupying a second bandwidth of the plurality of bandwidths;
upon determining that the incoming signal is an 802.11p communication then:
terminating the first processing; and
initiating a collision avoidance processing.

Example 7. The method of example 6 wherein the second bandwidth is less than the first bandwidth and wherein identifying the incoming signal comprises processing received signal samples to place a filter of the second bandwidth within the first bandwidth and evaluating an output of the filter to determine whether a signal of the second bandwidth exists within the first bandwidth.

Example 8. The method of examples 6 or 7 wherein a plurality of filters of the second bandwidth are placed within the first bandwidth.

Example 9. The method of examples 6, 7 or 8 further comprising forming an average over N short training sequence intervals and using the average to detect the incoming signal.

Example 10. The method of example 9 wherein N is either one or two.

Example 11. A wireless communication device comprising:
a receiver configured to receive communication signals occupying a plurality of bandwidths; and
a detector, in communication with the receiver, configured to detect a presence of an incoming signal;
a first incoming signal processor configured to:
determine whether the incoming signal is a first signal occupying a first of the plurality of bandwidths;
when the incoming signal is the first signal, terminate processing performed by a second incoming signal processor; and
when the incoming signal is not the first signal, execute a collision avoidance process associated with a second signal occupying a second of the plurality of bandwidths;
the second incoming signal processor configured to:
determine whether the incoming signal is the second signal;
when the incoming signal is the second signal, terminate processing performed by the first incoming signal processor; and
when the incoming signal is not the second signal, terminate processing associated with the second signal.

Example 12. The wireless communication device of example 11 wherein at least a portion of the first incoming signal processor is implemented using a processor and instructions.

Example 13. The wireless communication device of examples 11 or 12 wherein at least a portion of the second incoming signal processor is implemented using a processor and instructions.

Example 14. The device of examples 11, 12 or 13 wherein the first signal is associated with an 802.11n/ac communication and the second signal is associated with an 802.11p communication.

Example 15. The device of examples 11, 12, 13 or 14 wherein the first of the plurality bandwidths is greater than or equal to about 20 MHz.

Example 16. The device of examples 11, 12, 13, 14, or 15 wherein the second of the plurality of bandwidths is either about 10 MHz or about 5 MHz.

Example 17. The device of examples 11, 12, 13, 14, 15 or 16 wherein the receiver comprises circuitry to compute an average over N short training sequences.

Example 18. The device of example 17 wherein N is either one or two.

Example 19. The device of examples 11, 12, 13, 14, 15, 16, 17 or 18 wherein the first incoming signal processor is further configured to trigger processing associated with an 802.11n/ac standard when the incoming signal is the first signal.

Example 20. The device of examples 11, 12, 13, 14, 15, 16, 17, 18 or 19 wherein the second incoming signal processor is further configured to trigger a collision avoidance process when the incoming signal is the second signal.

Example 21. A computer readable storage media having executable instructions encoded thereon, which when executed, cause a system to perform a method comprising:
receiving an incoming signal occupying one of a plurality of bandwidths;
upon detection of the incoming signal, initiating a first processing of the incoming signal and a second processing of the incoming signal;
the first processing of the incoming signal comprising:
determining whether the incoming signal is an 802.11n/ac communication occupying a first bandwidth of the plurality of bandwidths;
upon determining that the incoming signal is an 802.11n/ac communication then:
terminating the second processing; and
initiating actions in accordance with the received 802.11n/ac communication;
the second processing of the incoming signal comprising:
determining whether the incoming signal is an 802.11p communication occupying a second bandwidth of the plurality of bandwidths;
upon determining that the incoming signal is an 802.11p communication then:
terminating the first processing; and
initiating collision avoidance processing.

Example 22. The computer readable storage medium of example 16 wherein the detection of the incoming signal comprises forming an average over N short training sequence intervals and using the average to detect the incoming signal.

What is claimed is:

1. A method comprising:
receiving an incoming signal occupying one of a plurality of bandwidths;
upon detection of the incoming signal, initiating a first processing of the incoming signal and a second processing of the incoming signal;
the first processing of the incoming signal comprising:
identifying the incoming signal as an 802.11n/ac communication occupying a first bandwidth of the plurality of bandwidths;
terminating the second processing; and
initiating actions in accordance with the received 802.11n/ac communication; the second processing of the incoming signal comprising:
identifying the incoming signal as an 802.11p communication occupying a second bandwidth of the plurality of bandwidths;
terminating the first processing; and
initiating collision avoidance processing.

2. The method of claim 1 wherein the second bandwidth is less than the first bandwidth and wherein identifying the incoming signal comprises processing received signal samples to place a filter of the second bandwidth within the first bandwidth and evaluating an output of the filter to determine whether a signal of the second bandwidth exists within the first bandwidth.

3. The method of claim 2 wherein a plurality of filters of the second bandwidth are placed within the first bandwidth.

4. The method of claims 1 further comprising forming an average over N short training sequence intervals and using the average to detect the incoming signal.

5. The method of claim 4 further comprising computing a moving average across one STS interval and wherein the STS interval is adjusted depending at least in part on N.

6. A wireless communication device comprising:
a receiver configured to receive communication signals occupying a plurality of bandwidths;
a first incoming signal processor configured to:
determine whether the incoming signal is a first signal occupying a first of the plurality of bandwidths;
when the incoming signal is the first signal, terminate processing performed by a second incoming signal processor; and
when the incoming signal is not the first signal, execute a collision avoidance process associated with a second signal occupying a second of the plurality of bandwidths; and
the second incoming signal processor configured to:

determine whether the incoming signal is the second signal;

when the incoming signal is the second signal, terminate processing performed by the first incoming signal processor; and when the incoming signal is not the second signal, terminate processing associated with the second signal.

7. The wireless communication device of claim 6 wherein at least a portion of the first incoming signal processor is implemented using a processor and instructions.

8. The wireless communication device of claim 6 wherein at least a portion of the second incoming signal processor is implemented using a processor and instructions.

9. The wireless communication device of claim 8 wherein the first signal is associated with an 802.11n/ac communication and the second signal is associated with an 802.11p communication.

10. The wireless communication device of claims 6 wherein the first of the plurality bandwidths is greater than or equal to about 20 MHz.

11. The wireless communication device of claim 10 wherein the second of the plurality of bandwidths is either about 10 MHz or about 5 MHz.

12. The wireless communication device of claim 6 wherein the receiver comprises circuitry to compute an average over N short training sequences.

13. The wireless communication device of claim 12 wherein the receiver circuitry computes a moving average across one STS interval and wherein the STS interval is adjusted depending at least in part on N.

14. The wireless communication device of claims 6 wherein the first incoming signal processor is further configured to trigger processing associated with an 802.11n/ac standard when the incoming signal is the first signal.

15. The wireless communication device of claims 6 wherein the second incoming signal processor is further configured to trigger a collision avoidance process when the incoming signal is the second signal.

16. A computer readable storage media having executable instructions encoded thereon, which when executed, cause a system to perform a method comprising:

receiving an incoming signal occupying one of a plurality of bandwidths;

upon detection of the incoming signal, initiating a first processing of the incoming signal and a second processing of the incoming signal;

the first processing of the incoming signal comprising:
identifying the incoming signal as an 802.11n/ac communication occupying a first bandwidth of the plurality of bandwidths;
terminating the second processing; and
initiating actions in accordance with the received 802.11n/ac communication; the second processing of the incoming signal comprising:
identifying the incoming signal as an 802.11p communication occupying a second bandwidth of the plurality of bandwidths;
terminating the first processing; and
initiating collision avoidance processing.

17. The computer readable storage medium of claim 16 wherein the detection of the incoming signal comprises forming an average over N short training sequence intervals and using the average to detect the incoming signal.

18. A wireless device comprising:

at least one antenna;

transceiver circuitry coupled to the at least one antenna, the transceiver circuitry configured to receive an 802.11p communication and an 802.11n/ac communication;

memory;

a processor coupled to the memory and transceiver circuitry; and instructions, stored in the memory, which when executed cause the processor to:
initiate a plurality of processes upon detection of an incoming signal, the plurality of processes comprising a first process associated with the 802.11n/ac communication and a second process associated with the 802.11p communication;
upon identification of the 802.11p communication:
terminate the first process; and
trigger 802.11p collision avoidance;
upon identification of the 802.11n/ac communication:
terminate the second process; and
continue 802.11n/ac processing.

19. The device of claim 18 wherein the transceiver circuitry averages N Short Training Sequence (STS) intervals and uses a resultant average to detect an incoming signal.

20. The device of claim 19 wherein the transceiver circuitry computes a moving average across one STS interval and wherein the STS interval is adjusted depending at least in part on N.

21. The device of claims 18 wherein the 802.11p collision avoidance comprises switching channels.

22. The device of claim 18 wherein the 802.11p collision avoidance comprises refraining from transmission for a period of time.

* * * * *